US009041589B2

(12) United States Patent
Chang et al.

(10) Patent No.: US 9,041,589 B2
(45) Date of Patent: May 26, 2015

(54) SYSTEMS AND METHODS FOR DETERMINING A RADAR DEVICE COVERAGE REGION

(75) Inventors: Hong Chang, Peoria, IL (US); Bradley Scott Kriel, Pittsburgh, PA (US); Michael Sean McDaniel, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 562 days.

(21) Appl. No.: 13/439,113

(22) Filed: Apr. 4, 2012

(65) Prior Publication Data
US 2013/0265189 A1    Oct. 10, 2013

(51) Int. Cl.
| | |
|---|---|
| G01S 13/00 | (2006.01) |
| G01S 7/40 | (2006.01) |
| G01S 13/87 | (2006.01) |
| G01S 17/87 | (2006.01) |
| G01S 13/86 | (2006.01) |
| G01S 13/93 | (2006.01) |
| G01S 13/42 | (2006.01) |

(52) U.S. Cl.
CPC .......... *G01S 13/87* (2013.01); *G01S 17/87* (2013.01); *G01S 7/4026* (2013.01); *G01S 13/865* (2013.01); *G01S 13/931* (2013.01); *G01S 13/42* (2013.01); *G01S 2013/9375* (2013.01); *G01S 2013/9378* (2013.01); *G01S 2013/9385* (2013.01); *G01S 2013/9332* (2013.01); *G01S 2013/936* (2013.01)

(58) Field of Classification Search
CPC ..... G01S 13/86; G01S 13/862; G01S 13/865; G01S 13/867
USPC ........................ 342/52, 54, 70–72, 165–175
See application file for complete search history.

(56) References Cited

U.S. PATENT DOCUMENTS

| | | | |
|---|---|---|---|
| 6,359,586 B1 * | 3/2002 | Sviestins ...................... 342/451 |
| 6,362,773 B1 * | 3/2002 | Pochmuller ..................... 342/52 |
| 6,515,615 B2 * | 2/2003 | Burchett et al. ................. 342/91 |
| 7,142,150 B2 * | 11/2006 | Thackray ......................... 342/54 |
| 7,376,247 B2 * | 5/2008 | Ohta et al. ..................... 382/103 |
| 7,460,951 B2 * | 12/2008 | Altan et al. .................... 701/536 |
| 7,501,980 B2 * | 3/2009 | Focke et al. ................... 342/174 |
| 7,777,666 B2 | 8/2010 | Gregory et al. |
| 8,005,301 B2 | 8/2011 | Plant |
| 2003/0030582 A1 * | 2/2003 | Vickers ........................... 342/54 |
| 2003/0090411 A1 * | 5/2003 | Haney et al. ................... 342/165 |
| 2003/0201929 A1 * | 10/2003 | Lutter et al. ..................... 342/52 |

(Continued)

FOREIGN PATENT DOCUMENTS

| | | |
|---|---|---|
| EP | 2 273 334 | 1/2011 |
| GB | 2471276 | 12/2010 |

*Primary Examiner* — Peter Bythrow
(74) *Attorney, Agent, or Firm* — Finnegan, Henderson, Farabow, Garrett & Dunner, LLP

(57) ABSTRACT

A system for determining a coverage region of a radar device is disclosed. The system may have one or more processors and a memory. The memory may store instructions that, when executed, enable the one or more processors to receive radar data generated by a radar device and lidar data generated by a lidar device. The radar data may include radar data points representing objects detected by the radar device and the lidar data may include lidar data points representing objects detected by the lidar device. The one or more processors may be further enabled to determine a radar coverage region for the radar device by comparing one or more radar data points to one or more lidar data points, and to generate data used to display a graphical representation of the radar coverage region.

18 Claims, 5 Drawing Sheets

(56) References Cited

U.S. PATENT DOCUMENTS

| | | | |
|---|---|---|---|
| 2004/0178945 A1* | 9/2004 | Buchanan | 342/70 |
| 2006/0125680 A1* | 6/2006 | Thackray | 342/54 |
| 2007/0073473 A1* | 3/2007 | Altan et al. | 701/207 |
| 2007/0182623 A1* | 8/2007 | Zeng et al. | 342/174 |
| 2009/0292468 A1* | 11/2009 | Wu et al. | 701/301 |
| 2010/0026555 A1* | 2/2010 | Whittaker et al. | 342/70 |
| 2010/0066587 A1* | 3/2010 | Yamauchi et al. | 342/70 |
| 2010/0175573 A1* | 7/2010 | Cornett et al. | 102/201 |
| 2010/0225531 A1* | 9/2010 | Johnson | 342/25 A |
| 2010/0235129 A1* | 9/2010 | Sharma et al. | 702/97 |
| 2010/0332056 A1* | 12/2010 | Kirk | 701/14 |
| 2011/0184617 A1* | 7/2011 | Hegemann et al. | 701/70 |
| 2013/0222174 A1* | 8/2013 | Choe et al. | 342/54 |

* cited by examiner

SYSTEMS AND METHODS FOR DETERMINING A RADAR DEVICE COVERAGE REGION

TECHNICAL FIELD

The present disclosure relates generally to methods and systems for determining coverage regions for a radar device and more particularly, to methods and systems for calibrating radar devices to be used on a machine.

BACKGROUND

Various machines, such as those that are used to dig, loosen, carry, compact, etc., different materials, may be equipped with object detection devices such as radio detection and ranging (radar) and/or light detection and ranging (lidar or LiDAR) devices. In one exemplary application, autonomous or semi-autonomous machines may use the object detection devices to detect objects in areas surrounding the machines as part of a collision avoidance mechanism. In any application where a machine is equipped with an object detection device such as a radar device, it may be desirable to ensure that the radar device is properly calibrated and positioned. Moreover, it may be desirable for people associated with the machine to be aware of the coverage region over which the radar device is capable of detecting objects, as well as the accuracy with which the radar device detects objects within the coverage region.

A system that may be used to calibrate sensors mounted on a vehicle is disclosed in U.S. Patent Publication No. 2010/0235129 to Sharma et al. that was published on Sep. 16, 2010 (the '129 publication). The system in the '129 publication incorporates vision sensors such as cameras with a lidar sensor to detect obstacles around the vehicle. The outputs from the vision sensor and the lidar sensor are correlated to produce fused sensor data the represents the detected obstacles. The tilt of the vision sensor may be adjusted based on the correlated outputs.

Although the system of the '129 publication may be useful for calibrating a multi-sensor system while performing object detection, the system may not be cost-effective because it requires at least two sensors to be mounted to the vehicle for each field of vision that is to be monitored. For example, the system of the '129 publication requires both a vision sensor and a lidar sensor when detecting objects around the vehicle. Moreover, while the '129 publication discloses calibrating the multi-sensor system, it does not disclose generating and displaying a graphical representation of the coverage regions for any of the sensors.

The disclosed coverage determining system is directed to overcoming one or more of the problems set forth above and/or other problems of the prior art.

SUMMARY

In one aspect, the present disclosure is directed to a computer-implemented method for determining a coverage region of a radar device. The computer-implemented method may include receiving radar data generated by a radar device and lidar data generated by a lidar device. The radar data may include radar data points representing objects detected by the radar device and the lidar data may include lidar data points representing objects detected by the lidar device. The computer-implemented method may also include determining a radar coverage region for the radar device by comparing one or more radar data points to one or more lidar data points, and generating data used to display a graphical representation of the radar coverage region.

In another aspect, the present disclosure is directed to a system for determining a coverage region of a radar device. The system may include one or more processors and a memory. The memory may store instructions that, when executed, enable the processors to receive radar data generated by a radar device and lidar data generated by a lidar device. The radar data may include radar data points representing objects detected by the radar device and the lidar data may include lidar data points representing objects detected by the lidar device. The one or more processors may be further enabled to determine a radar coverage region for the radar device by comparing one or more radar data points to one or more lidar data points, and generate data used to display a graphical representation of the radar coverage region.

In yet another aspect, the present disclosure is directed to a machine, such as a material-moving machine. The machine may include a radar device. The radar device may have been configured by receiving radar data generated by the radar device and lidar data generated by a lidar device, the radar data including radar data points representing objects detected by the radar device and the lidar data including lidar data points representing objects detected by the lidar device. The radar device may have been further configured by determining a radar coverage region for the radar device by comparing one or more radar data points to one or more lidar data points, and generating data used to display a graphical representation of the radar coverage region.

DETAILED DESCRIPTION

Figure 1:
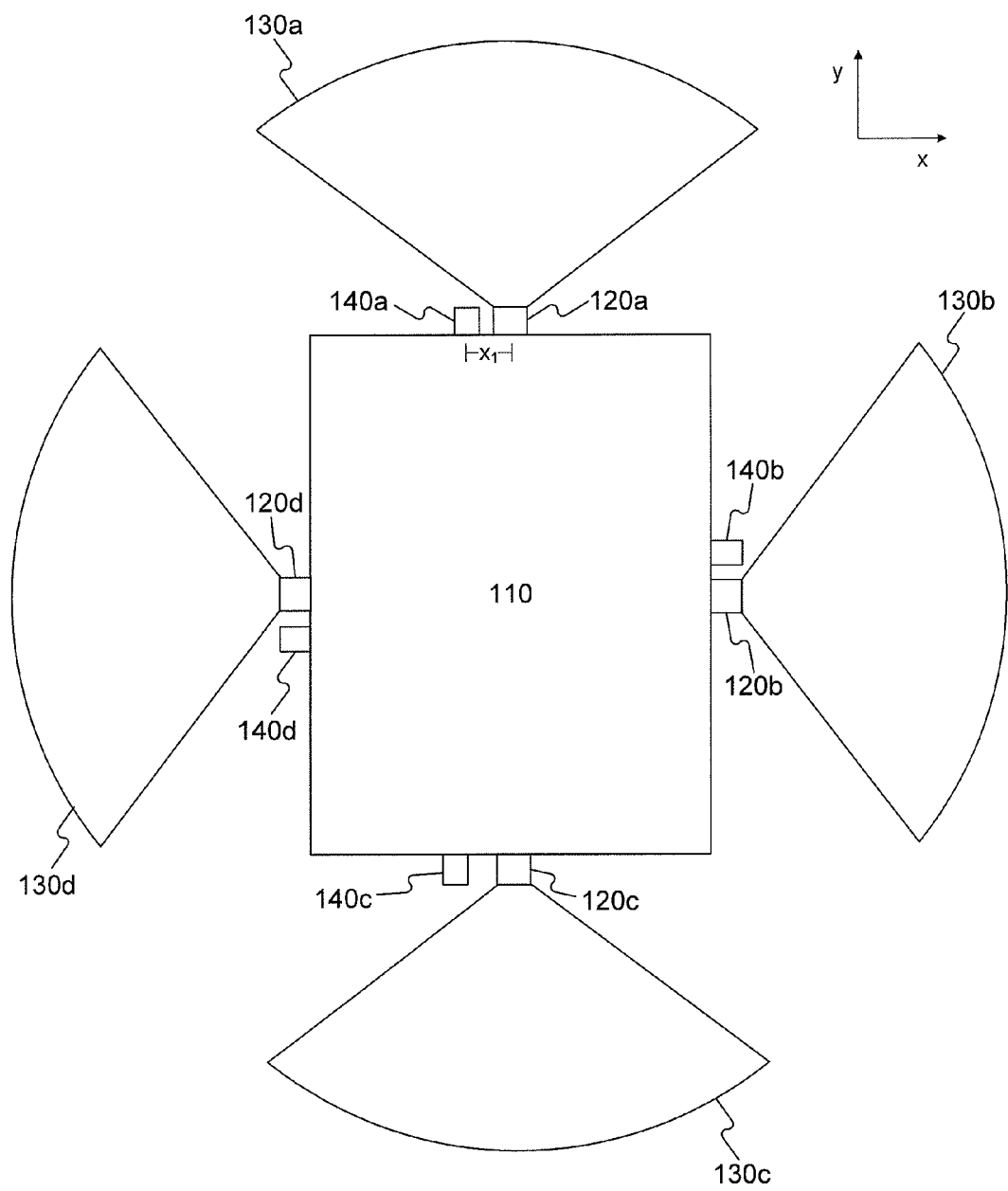
FIG. 1 is a pictorial illustration of an exemplary disclosed machine.

FIG. 1 illustrates a machine 110 that may be any type of machine such as an autonomous, semi-autonomous, or non-autonomous loader, dozer, tractor, compactor, etc. Machine 110 may include one or more of radar devices 120*a*-120*d* and lidar devices 140*a*-140*d*. In certain embodiments, radar devices 120*a*-120*d* may be included on machine 110 during operation of machine 110, e.g., as machine 110 moves about an area to complete certain tasks such as digging, loosening, carrying, drilling, compacting, etc., different materials.

Machine 110 may use radar devices 120*a*-120*d* to detect objects in their respective fields of view 130*a*-130*d*. For example, radar device 120*a* may be configured to scan an area within field of view 130*a* to detect the presence of one or more objects therein. During operation, one or more systems of machine 110 (not shown) may process the radar data received from radar device 120*a* to control the movement of machine 110. For example, a navigation system may use radar data to control the movement of machine 110 in accordance with a predefined route over which machine 110 is configured to travel. Moreover, a collision avoidance system may use radar data to control machine 110 so as to prevent it from colliding with objects in its path.

Lidar devices 140a-140d may be used to determine coverage regions of corresponding radar devices 120a-120d and/or to calibrate one or more of a location and orientation of radar devices 120a-120d. In certain embodiments, as discussed in greater detail below, lidar devices 140a-140d may be temporarily installed on machine 110 to determine the coverage regions of and/or to calibrate radar devices 120a-120d, and may then be removed prior to operation of machine 110. That is, lidar devices 140a-140d may be removed from machine 110 after one or more of the radar coverage region determination processes discussed below, and machine 110 may be operated with radar devices 120a-120d that were calibrated based on these processes.

While machine 110 is shown having four radar devices 120a-120d, those skilled in the art will appreciate that machine 110 may include any number of radar devices arranged in any manner. For example, machine 110 may include eight radar devices, two on each side of machine 110. In this embodiment, a single lidar device may be used to calibrate two radar devices, independently or at the same time, in accordance with the embodiments discussed below.

Figure 2:
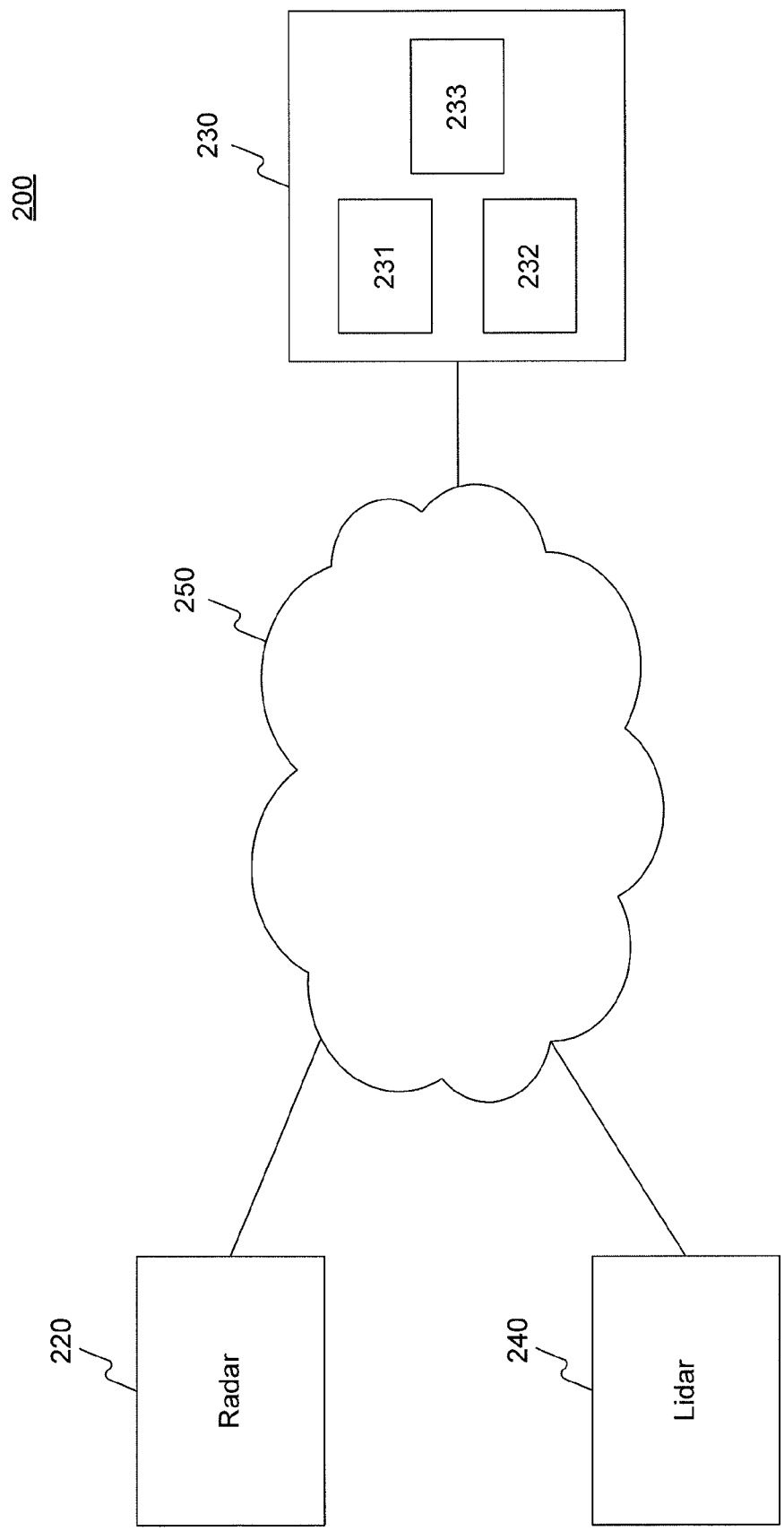
FIG. 2 is a diagrammatic illustration of an exemplary coverage determining system that may be used to determine coverage regions for radar devices included on the machine of FIG. 1.

FIG. 2 is a block diagram of an exemplary coverage determining system 200 that may be used to determine coverage regions for radar devices included on machine 110 of FIG. 1. Coverage determining system 200 may include a radar device 220 and a lidar device 240 connected to a coverage determining device 230 via a network 250. Radar device 220 may correspond to one of radar devices 120a-120d and lidar device 240 may correspond to one of lidar devices 140a-140d, for example. Moreover, while only one radar device 220 and one lidar device 240 are shown in FIG. 2, those skilled in the art will appreciate that any number of radar devices and lidar devices may be included in coverage determining system 200.

Coverage determining system 200 may be configured to determine a radar coverage region for radar device 220 and generate data for calibrating a location and/or orientation of radar device 220 on a machine, such as machine 110. A radar coverage region, as discussed in greater detail below, may include an indication of a range over which a radar device may be able to detect objects within its field of view. In certain embodiments, the radar coverage region may be divided into sub-regions which may each include an indication of the accuracy with which the radar device can detect objects within the particular sub-region. Further, as discussed below, coverage determining system 200 may also be configured to generate graphical representations of the radar coverage region in the form of coverage maps.

Radar device 220 may include any type of device that uses radio waves to detect the presence of an object and/or determine a distance to the object. For example, radar device 220 may be configured to scan an area in the field of view of radar device 220 and detect the presence of an object within the field of view. In certain embodiments, radar device 220 may generate up to a predetermined number of data points, such as eight data points, each time radar device 220 scans the field of view. Each data point generated by radar device 220 may include a bearing (angle) value and a range (distance) value.

Lidar device 240 may likewise include any type of device that uses light waves to detect the presence of an object and determine a distance to the object. In certain embodiments, lidar device 240 may be a scanning lidar device that provides data points at predetermined intervals. For example, lidar device 240 may be configured to scan over 180 degrees and provide a data point at half-degree intervals, thus producing 360 data points each time it scans its field of view. Lidar device 240 may then generate a point cloud of data points for each scan, with each data point in the point cloud including a bearing (angle) value and a range (distance) value.

During operation of coverage determining system 200, radar device 220 and lidar device 240 may be configured to collect data in corresponding areas. That is, radar device 220 and lidar device 240 may be positioned substantially close to each other, as shown in FIG. 1, so that the field of view of radar device 220 overlaps with the field of view of lidar device 240. Radar device 220 and lidar device 240 may further be configured to send radar data and lidar data to coverage determining device 230. The radar data may include the radar data points measured by radar device 220 and the lidar data may include the lidar data points measured by lidar device 240 during one or more scans of their respective fields of view.

Coverage determining device 230 may include one or more communication ports (not shown) that enable coverage determining device 230 to receive the data from radar device 220 and/or lidar device 240 via network 250. Additionally, coverage determining device 230 may include one or more input/output devices, e.g., a display device, touch screen, mouse, keyboard, etc., that enable a user to interface with coverage determining device 230. In certain embodiments, coverage determining device 230 may be a computer such as a laptop or tablet computer.

Coverage determining device 230 may also include a processor 231, a storage 232, and a memory 233. Processor 231 may include one or more processing devices, such as a microprocessor from the Pentium™ or Xeon™ family manufactured by Intel™, the Turion™ family manufactured by AMD™, or any other type of processor. Storage 232 may include a volatile or non-volatile, magnetic, semiconductor, tape, optical, removable, nonremovable, or other type of storage device or computer-readable medium. Storage 232 may store programs and/or other information, such as coverage region determination programs and any other information used to determine radar coverage regions and/or calibrate radar devices, as discussed in greater detail below. Memory 233 may include one or more storage devices configured to store information used by coverage determining device 230 to perform certain functions related to disclosed embodiments.

In one embodiment, memory 233 may include one or more coverage region determining programs or subprograms loaded from storage 232 or elsewhere that, when executed by processor 231, perform various procedures, operations, or processes consistent with the disclosed embodiments. For example, memory 233 may include one or more programs that enable coverage determining device 230 to, among other things, receive radar data points from radar device 220 and lidar data points from lidar device 240, determine a radar coverage region for the radar device by comparing one or more radar data points to one or more lidar data points, and generate data used to display a graphical representation of the radar coverage region, e.g., a radar coverage map.

Network 250 may include any one of or combination of wired or wireless networks. For example, network 250 may include wired networks such as twisted pair wire, coaxial cable, optical fiber, and/or a digital network. Network 250 may further include any network configured to enable communication via a CAN-bus protocol. Likewise, network 250 may include any wireless networks such as RFID, microwave or cellular networks or wireless networks employing, e.g., IEEE 802.11 or Bluetooth protocols. Additionally, network 250 may be integrated into any local area network, wide area network, campus area network, or the Internet.

Figure 3:
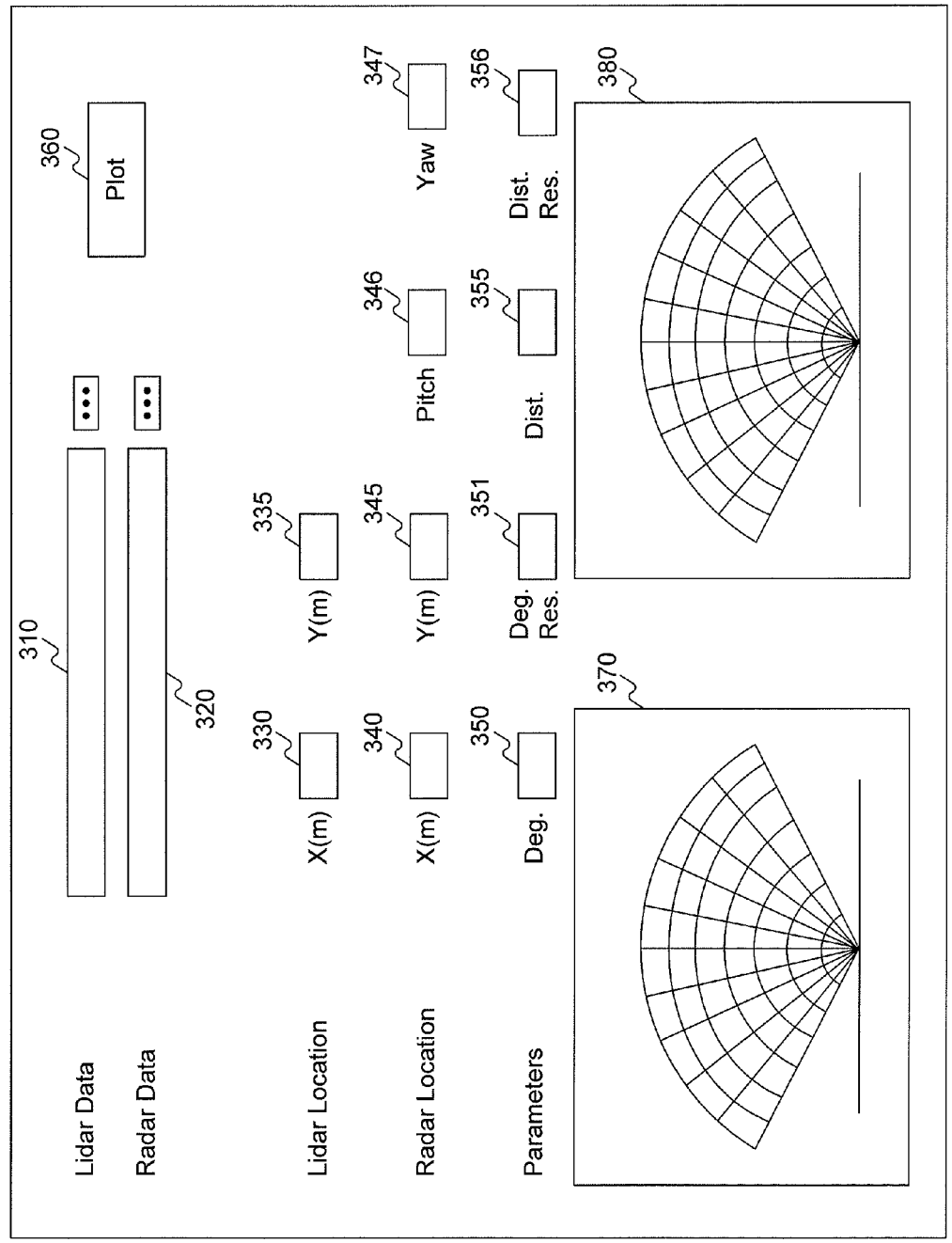
FIG. 3 is a pictorial illustration of an exemplary disclosed graphical user interface that may be used to interface with the system of FIG. 2.

FIG. 3 illustrates an exemplary graphical user interface (GUI) 300 that may be used to interface with coverage determining device 230. For example, coverage determining device 230 may display GUI 300 on a display device associated with coverage determining device 230. A user may be able to interface with coverage determining device 230 by entering information into GUI 300 using one or more of the input/output devices of coverage determining device 230, discussed above. For example, a user may enter information into lidar data input field 310 and radar data input field 320 to designate a location from which coverage determining device 230 may receive the lidar data and the radar data. In certain embodiments, the user may specify a location in memory where previously collected lidar data and/or radar data has been stored. In other embodiments, the user may specify a lidar device and/or a radar device from which data is to be collected. For example, the user may specify communications ports to which the lidar device and the radar device are connected.

GUI 300 may include a lidar x location input field 330 and a lidar y location input field 335 for inputting data related to the location of lidar device 240, e.g., on machine 110. GUI 300 may also include a radar x location input field 340, a radar y location input field 345, a radar pitch input field 346, and a radar yaw input field 347 for inputting data related to the location and orientation of radar device 220. The data in these input fields may be used to determine where radar device 220 is located and oriented relative to lidar device 240.

The directions of the x-axis and y-axis along which the data in the location input fields are measured may vary based on the positioning of radar device 220 and lidar device 240 and/or may be configurable by the user. For example, with reference to FIG. 1, assume that radar device 220 corresponds to radar device 120a and lidar device 240 corresponds to lidar device 140a. The x- and y-axes may be configured as shown in FIG. 1. A user may input the locations of lidar device 140a and radar device 120a into the input fields based on a distance from some origin point chosen in the x-y plane. Alternatively, the user may choose the location of lidar device 140a or radar device 120a to be the origin. For example, if the user chooses the location of lidar device 140a to be the origin, then the user may enter "0" in both lidar x location input field 330 and lidar y location input field 335. Because radar device 120a is aligned in the y-direction with lidar device 140a and separated by a distance $x_1$ from lidar device 140a in the x-direction, the user may enter "0" in radar y location input field 345 and a value "$x_1$" in radar x location input field 340.

Using the exemplary orientation discussed above, the user may also enter into radar pitch input field 346 a value corresponding to the angular rotation of radar device 120a about the x-axis and may enter into radar yaw input field 347 a value corresponding to the angular rotation of radar device 120a about a z-axis (not shown) that is perpendicular to both the x-axis and y-axis. In certain embodiments, GUI 300 may also include similar input fields for entering pitch and yaw information for lidar device 140a.

GUI 300 may also include input fields for determining parameters used to analyze the coverage region. For example, degree range input field 350 may be used to specify the range of degrees over which the radar data should be analyzed when determining the radar coverage region. Degree resolution input field 351 may be used to specify the number of times the radar coverage region should be divided along the range of degrees included in the radar coverage region. Distance range input field 355 may be used to specify the range of distances over which the radar data should be analyzed when determining the radar coverage region. Distance resolution input field 356 may be used to specify the number of times the radar coverage region should be divided along the distance range included in the radar coverage area. Thus, by entering information into degree resolution input field 351 and distance resolution input field 356, a user may specify the number of sub-regions into which a radar coverage region may be divided.

GUI 300 may also include a plot button 360. Selecting the plot button may cause GUI 300 to display graphical representations of the radar coverage region, e.g., as coverage maps in a first plot area 370 and/or a second plot area 380. In certain embodiments, GUI 300 may display an actual coverage map of radar device 220 based on a comparison of radar data and lidar data in first plot area 370 and may display an ideal or expected coverage map in second plot area 380.

Figure 4:
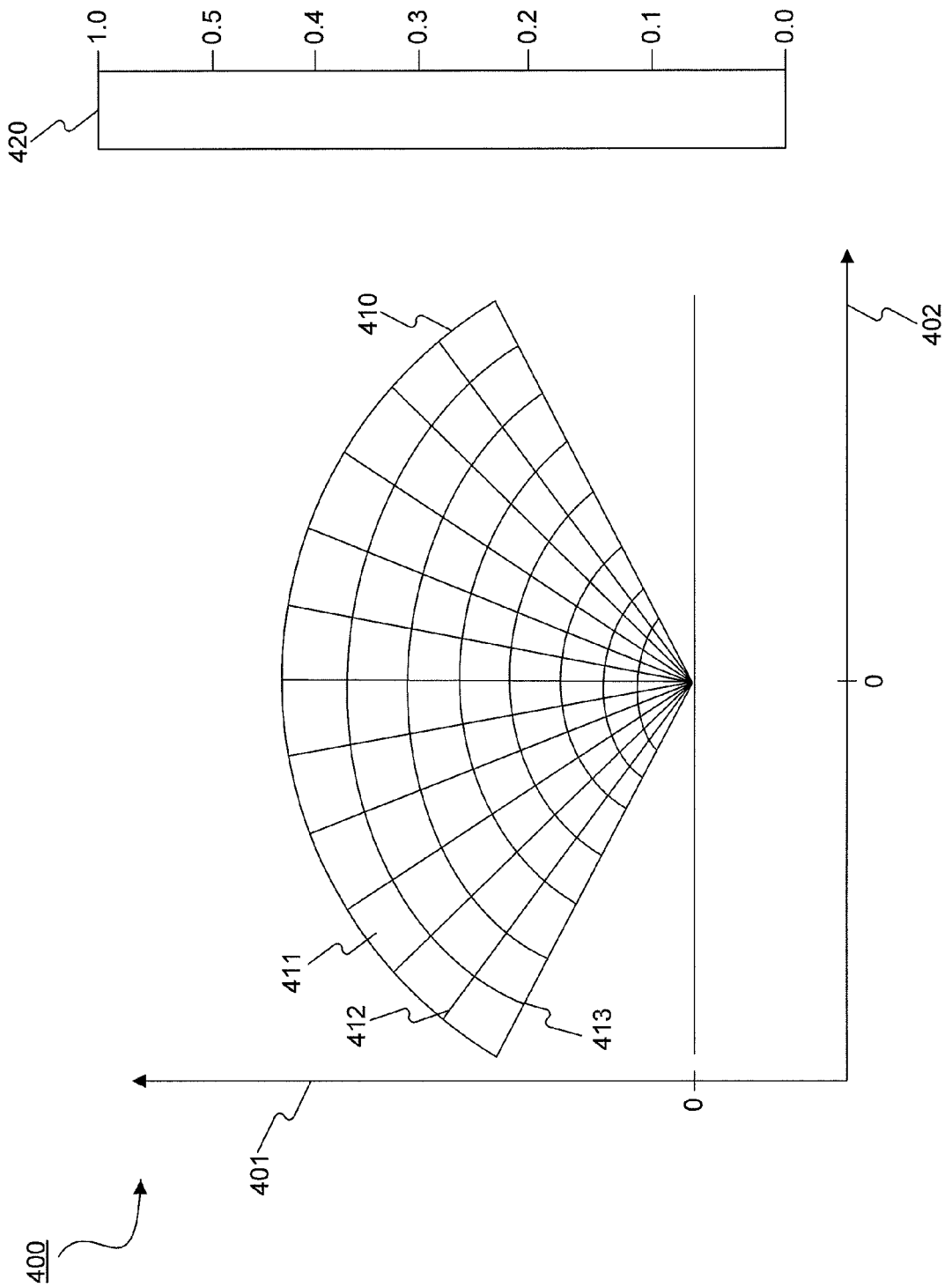
FIG. 4 is a pictorial illustration of an exemplary disclosed coverage map that may be generated by the system of FIG. 2.

FIG. 4 illustrates an exemplary coverage map 400 that may be displayed in one or more of first plot area 370 or second plot area 380 of GUI 300, for example. Coverage map 400 may include a graphical representation of a radar coverage region of radar device 220 displayed as a grid 410 within y-axis 401 and x-axis 402. Grid 410 may include extending boundaries 412 and curved boundaries 413 that divide grid 410 into sub-regions such as sub-region 411. As discussed above, the number of extending boundaries 412 and curved boundaries 413 (and thus the number of sub-regions 411) may be configured by the user, e.g., via GUI 300.

As discussed in greater detail below, coverage determining system 200 may calculate accuracy levels of radar device 220 for each sub-region 411, e.g., based on a comparison of radar data points and lidar data points received from radar device 220 and lidar device 240. Coverage determining system 200 may also display a graphical indication of the accuracy value for each sub region as a part of coverage map 400. For example, each sub region 411 within coverage map 400 may be filled with a color corresponding to the accuracy value for that sub-region.

Coverage map 400 may also include a scale 420 for interpreting the graphical indications of the accuracy levels. For example, in the embodiment shown in FIG. 4, the accuracy level for a sub-region may be determined to be an average distance (e.g., measured in meters) between each radar data point measured in the sub-region and its corresponding lidar data point (exemplary processes for determining accuracy levels are discussed in greater detail below). The accuracy level for each sub-region may be calculated in this manner, and the sub-region may be filled with a color based on the accuracy level (e.g., calculated average distance). For example, scale 420 may start at 0.0 meters and with a color green, and may transition to a yellow color near 0.3 to 0.5 meters, finally changing to a red color at and beyond 1.0 meters. Each sub region 411 may be filed with the appropriate color based on its corresponding accuracy level.

While green, yellow, and red are used as exemplary colors for scale 420, those skilled in the art will appreciate that any colors may be used. Moreover, any visual representation other than or in addition to colors may be used. For example, different shading types or degrees of grayscale may be used to indicate different accuracy levels. This way, each sub region displayed in coverage map 400 may be displayed with a particular color, degree of shading, grayscale level, pattern, and/or other visual indication that corresponds to the accuracy level calculated for that sub region.

Further, calculating an accuracy level based on an average distance between radar data points and corresponding data points is only one exemplary way of calculating an accuracy level for a sub-region. This exemplary embodiment is discussed in greater detail below, along with other exemplary embodiments for calculating accuracy levels. Those skilled in the art will appreciate that coverage map 400 may be used to include graphical indications of the accuracy levels regardless of how the accuracy level is calculated.

Figure 5:
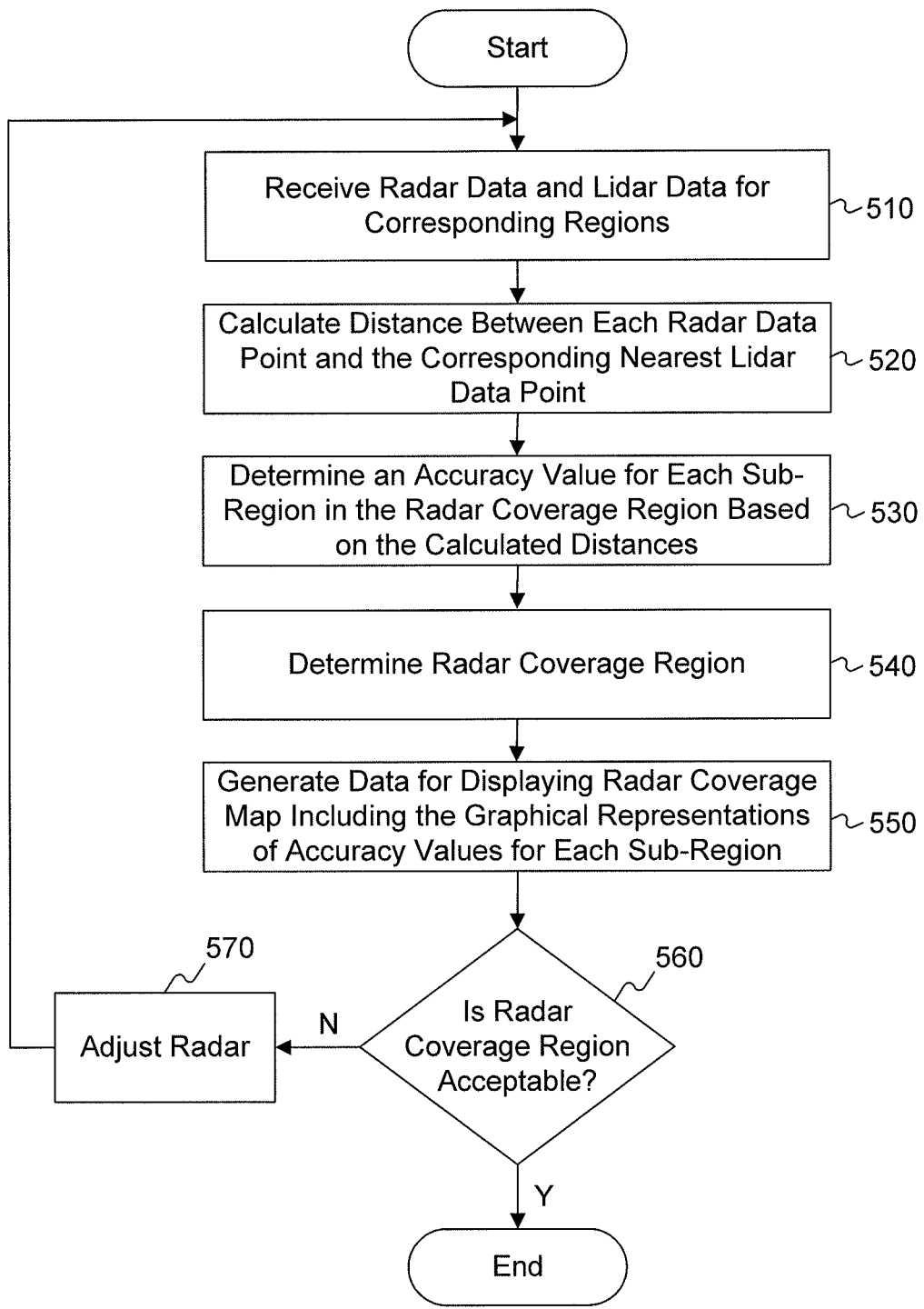
FIG. 5 is a flowchart depicting an exemplary disclosed method that may be performed by the system of FIG. 2.

FIG. 5 is an exemplary process for determining a radar coverage region, generating data for displaying a radar coverage map, and calibrating a radar device. One or more steps of the process shown in FIG. 5 may be performed by one or more components of coverage determining system 200. For example, coverage determining device 230 may receive radar data from radar device 220 and lidar data from lidar device 240 (step 510). Radar device 220 and lidar device 240 may scan overlapping or otherwise similar regions when generating their respective data. In certain embodiments, the radar data and lidar data may be collected over a period of time, as radar device 220 and lidar device 240 repeatedly scan the region. During this time, location of objects within the region may change, e.g., based on a movement of machine 110 and/or based on movement of the objects. In one embodiment, a user that is calibrating radar device 220 may iteratively move an object throughout the region. For example, the user may position one or more objects in particular locations for a period of time, then move the object(s) to other location(s). The user may continue to move the object(s) throughout different locations in the region until the user is satisfied with the number of data points. In certain embodiments, the user may be the object and may walk to different locations in the region as radar device 220 and lidar device 240 detect the presence of the user at the different locations.

Thus, the radar and lidar data received by coverage determining device 230 may be in the format of time-stamped data series, with a timestamp representing the time of the particular scan and data points corresponding to the timestamp representing objects detected during that particular scan. As discussed above, in certain embodiments, radar device 220 may output up to a predetermined number of data points for each scan of the region. Thus exemplary radar data may be in the format shown in the table below:

| Timestamp | Bearing | Range |
| --- | --- | --- |
| 0001 | 25° | 15.0 m |
|  | 45° | 30.5 m |
|  | 125° | 12.5 m |
| 0002 | 27° | 14.5 m |
|  | 45° | 32.0 m |
|  | 125° | 12.5 m |

As shown in the table, radar device 220 may generate multiple data points, shown as a bearing, range pair for each time stamp. Thus, according to the table above, in the first time stamp, radar device 220 detected three objects at bearings of 25°, 45°, and 125° and at distances from radar device 220 as indicated by the corresponding range values. The time stamp values may be shown as integer values, counting each scan of radar device 220, and/or may include a time value indicating a time at which the particular scan took place.

Likewise, as discussed, lidar device 240 may generate lidar data points at predetermined intervals. For example, lidar device 240 may be configured to scan over 180 degrees and provide a data point at half-degree intervals, thus producing 360 data points each time it scans its field of view. Thus, exemplary lidar data for a single timestamp may be represented in the format shown in the table below:

| Timestamp | Bearing | Range |
| --- | --- | --- |
| 0001 | 0° | — |
|  | 0.5° | — |
|  | ... | ... |
|  | 25.0° | 14.9 m |
|  | 25.5° | 14.9 m |
|  | ... | ... |
|  | 44.0° | 30.5 m |
|  | 44.5° | — |
|  | ... | ... |
|  | 124.5° | 12.8 m |
|  | 125° | 12.8 m |
|  | ... | ... |
|  | 180° | — |

As shown in the table, lidar device 240 may generate data points, shown as a bearing/range pair, at regular intervals (e.g., 0.5° in the example shown above) at each time stamp. Thus, at several data points in the point cloud for each time stamp, an object may not be present. In the table above, the absence of an object is indicated with "−" although other indications, such as a maximum range value, may also indicate the absence of any object at the particular bearing. Moreover, because lidar device 240 may be configured to scan at predetermined intervals, multiple data points may represent the presence of a single object, based, e.g., on the size of the object and its distance from lidar device 240. For example, as shown in the table above, a single object near bearing 25.0° was also detected at the subsequent data point corresponding to bearing 25.5°. As with the radar data, time stamp values in the lidar data may be shown as integer values, counting each scan of lidar device 240, and/or may include a time value indicating a time at which the particular scan took place.

After receiving the radar data and the lidar data, coverage determining system 200 may analyze the data points in the data to calculate a distance between each radar data point included in the radar data and a corresponding nearest lidar data point (step 520). For example, using the timestamp information, coverage determining system 200 may identify the lidar data point that was obtained at a time closest to the radar data point and/or at a bearing closest to the bearing of the radar data point and may calculate a distance between these two data points. For example, using the exemplary lidar and radar data shown above, coverage determining system 200 may determine that the lidar data points collected in timestamp 0001 were taken most closely in time to the radar data points collected in timestamp 0001. Thus, coverage determining system 200 may determine that the three radar data points in time stamp 0001 correspond to the lidar data points in time stamp 0001 that were received at similar angles. Coverage determining system 200 may then determine a distance between the points in space measured represented by the radar data points and the points in space represented by their corresponding lidar data points.

As discussed above, radar device 220 and lidar device 240 may be separated by a non-zero distance. For example, as discussed with respect to FIG. 3, a user may provide coverage determining system 200 with information specifying the relative location of radar device 220 with respect to lidar device 240, and vice versa. This information may be used when calculating the distances between the radar data points and their corresponding lidar data points. In one embodiment, each radar data point, represented above as a range and bearing pair, may be transformed into a Cartesian data point in two or three dimensions. For example, based on the specified location of radar device 220 and the values of the range and bearing in each radar data point, coverage determining system 200 may calculate a location of each radar data point as $(x_r, y_r)$, where $x_r$ represents a distance from a point of origin along an x-axis and $y_r$ represents a distance from a point of origin along a y-axis. Likewise, based on the specified location of lidar device 240 and the values of the range and bearing in each lidar data point, coverage determining system 200 may calculate a location of each lidar data point as $(x_L, y_L)$. Then, coverage determining system 200 may calculate the distance between the corresponding lidar and radar data points as $D=((x_L-x_r)^2+(y_L-y_r)^2)^{1/2}$.

With reference to the tables shown above, those skilled in the art will recognize that in some cases, one radar data point will have exactly one corresponding lidar data point, as is the case with the (45°, 30.5 m) radar data point in timestamp 0001 that has a corresponding lidar data point (44.0°, 30.5 m) in timestamp 0001. However, in some cases, one radar point may have multiple corresponding lidar data points, as is the case with the (25°, 15.0 m) radar data point in timestamp 0001 that has corresponding lidar data points (25.0°, 14.9 m) and (25.5°, 14.9 m) in timestamp 0001. In situations where multiple corresponding lidar data points exist, coverage determining system 200 may select the lidar data point that is closest to the corresponding radar data point when calculating the distance. In another embodiment, coverage determining system 200 may calculate an average lidar data point that represents an average value of the corresponding lidar data points and use the average lidar data point when calculating the distance.

As shown in step 520, coverage determining system 200 may calculate the distance value using the process discussed above for each radar data point included in the radar data. After calculating the distance values, coverage determining system 200 may determine an accuracy value for each sub-region in the radar coverage region based on the calculated distances (step 530). For example, as shown in coverage map 400 of FIG. 4, which is an exemplary graphical representation of a radar coverage region, the coverage region may be divided into sub-regions, such as sub-region 411. Each sub-region may span a distance range and a bearing range as measured from radar device 220. For example, sub-region 411 may include a bearing range of 40.1°-45° and a distance range of 30-35 m. A subsequent sub-region may include a bearing range of 45.1°-50° and a distance range of 30-35 m. The entire radar coverage region may be divided into similar sub-regions. As discussed above with regard to FIG. 3, a user may configure the number of sub-regions into which a radar coverage region will be divided.

To determine accuracy values for each sub-region, coverage determining system 200 may sort the calculated distance values, discussed above with regard to step 520, into groups corresponding to the sub-region within which the radar data point is located. For example, the exemplary radar data point (45°, 30.5 m) in timestamp 0001 is located in sub-region 411 having a bearing range of 40.1°-45° and a distance range of 30-35 m. Thus, when coverage determining system 200 calculates the distance between this radar data point and its corresponding lidar data point, coverage determining system 200 may group the calculated distance with other distances that correspond to the same sub-region. Accordingly, coverage determining system 200 may group and store the calculated distances according to their corresponding sub-regions, as indicated in the exemplary table below:

| Sub-Region | Timestamp | Distance |
|---|---|---|
| 1 | 0001 | 0.1 m |
|   | 0002 | 0.2 m |
|   | ... |   |
|   | 0099 | 0.5 m |
|   | 0100 | 0.0 m |
| 2 | 0002 | 0.0 m |
|   | 0003 | 0.1 m |
|   | ... |   |
|   | 0100 | 0.4 m |

As shown in the table above, coverage determining system 200 may group all of the distances corresponding to sub-region 1 together, all of the distances corresponding to sub-region 2 together, etc. Also, as shown, each sub-region may not have a distance calculation for each time stamp, because there may not be a radar data point at every time stamp for that sub-region.

Coverage determining system 200 may then use these organized calculated distances to determine an accuracy value for each sub-region. The accuracy value may be calculated in several different ways according to disclosed embodiments. For example, in one embodiment, the accuracy value may be calculated as an average of the distances for each sub-region. Referring to sub-region 1 in the table above, the accuracy level may thus be calculated as (0.1+0.2+0.5+0.0)/(4)=0.2. Likewise, sub-region 2 may have an accuracy level of (0.0+0.1+0.4)/(3)=0.167. In this case, the higher the number, the less accurate radar device 220 may be.

In another embodiment, the accuracy value may be calculated as a percentage of calculated distances in a sub-region that are less than or equal to a threshold distance value. For example assume that the threshold distance value is 0.4 m. Sub-region 1 in the table above may have an accuracy value of 0.75 or 75%, because three of the four calculated distances are less than or equal to 0.4 m. Likewise, sub-region 2 in the table above may have an accuracy value of 100% because all three calculated distances are less than or equal to 0.4 m. In this case, the higher the number, the more accurate radar device 220 may be.

In yet another embodiment, the accuracy value may be calculated based on a number of false positive radar data points. A false positive radar data point may occur when radar device 220 detects an object at a particular bearing and distance, but lidar device 240 does not detect an object, and, in fact, no object was in the location detected by radar device 220. The number of false positive radar data points for a sub-region may be determined based on the calculated distances. For example, a false positive may be identified by a radar data point whose calculated distance from the closest lidar data point exceeds an allowable distance, such as 3.0 m, 5.0 m, etc. Any distance greater than this allowable distance may indicate that the object being detected by radar device 220 does not actually exist. Thus, referring again to the table above, sub-regions 1 and 2 do not contain any false positives. However, a data point with a distance value that exceeds the allowable distance may be identified as a false positive radar data point. In these embodiments, the accuracy value for a sub-region may be calculated as the percentage of radar data points in a sub-region that are not identified as a false positive. Thus, the higher the value, the more accurate radar device 220 may be.

In still another embodiment, the accuracy value may be calculated based on a number of false negative radar data points. A false negative radar data point may occur when radar device 220 fails to detect an object at a particular bearing and distance that is being detected by lidar device 240. Coverage determining system 200 may identify false negative radar data points by comparing the lidar data points in the lidar data to determine if lidar device 240 has detected an object that has not been detected by radar device 220 (i.e. no radar data point exists that corresponds to the lidar data point). The accuracy value for a sub-region may be calculated as a percentage of radar points in a sub-region that are not identified as a false negative. In certain embodiments, the accuracy value may be calculated as the percentage of data points for a sub-region that are neither false positives nor false negatives.

After the accuracy values for each coverage region have been determined, coverage determining system 200 may determine the radar coverage region of radar device 220 (step 540). In certain embodiments, the radar coverage region may be defined as a group of sub-regions with accuracy values within a preferred range. For example, where the accuracy values are calculated as a percentage of calculated distances in a sub-region that are less than or equal to a threshold value, the radar coverage region may be defined as the sub-regions that have accuracy values within a range such as 90%-100%. Of course, other ranges may be used.

Coverage determining system 200 may also generate data for displaying a radar coverage map of the radar coverage region that includes graphical representations of accuracy values for each sub-region (step 550). For example, as discussed above with regard to FIG. 4, the sub-regions in coverage map 400 may be filled with colors corresponding to their accuracy values. Thus, sub-regions within a particular accuracy value range (e.g., 95%-100% in the embodiment where accuracy values are calculated based on the percentage of calculated distances that are less than or equal to a threshold value) may be colored green, sub-regions within another accuracy value range (e.g., 90%-100%) may be colored yellow, and sub-regions within another accuracy value range (e.g., 0%-90%) may be colored red. These ranges are, of course, exemplary, and any other ranges may be used.

This data may be used to determine whether the current radar coverage region is acceptable (step 560). For example, data may be sent to a display device associated with coverage determining system 200 to display the coverage map to a user including the colored sub-regions, so that a user can visually determine the coverage region for a radar device and determine whether or not the coverage region is acceptable, e.g., by comparing it to an ideal or expected coverage region. For example, as discussed with respect to FIG. 3, the current coverage region may be displayed in first plot area 370 and an ideal or expected coverage region may be displayed in second plot area 380 of GUI 300, so that a user can compare the two plots.

In another embodiment, coverage determining system 200 may determine whether the radar coverage region is acceptable independent of a user's visual comparison. For example, coverage determining system 200 may compare the calculated accuracy values of each sub-region with ideal or expected accuracy values for corresponding sub-regions in an ideal or expected coverage region stored at coverage determining system 200. In one exemplary embodiment, coverage determining system 200 may calculate a difference between the calculated accuracy value and the ideal or expected accuracy value for each cell and may compare the differences, e.g., to a threshold value. If the one or more of the differences between the accuracy values exceeds the threshold, then coverage determining system 200 may determine that the radar coverage region is not acceptable. In another exemplary embodiment, coverage determining system 200 may average the differences between the accuracy values for each sub-region and compare the average value to a threshold value. Again, if the average value exceeds a threshold, coverage determining system 200 may determine that the coverage region is not acceptable.

If, at step 560, it is determined that the radar coverage region is not acceptable (step 560, N) then the location and/or orientation of radar device 220 may be adjusted (step 570) and the process may return to step 510 where new radar and lidar data is collected for the new location and/or orientation of radar device 220. For example, a user of coverage determining system 200 may interpret coverage map 400 to determine how to adjust the location and/or orientation of radar device 220.

If it is determined that the radar coverage region is acceptable (step 560, Y), then the process may end and radar device 220 may be considered to be calibrated for use. In this case, the user may remove lidar device 240 and machine 110 may be operated using radar device 220 without the need for lidar device 240.

INDUSTRIAL APPLICABILITY

The disclosed coverage determining system 200 may be applicable to any machine that includes a radar device. The disclosed coverage determining system 200 may allow a user of machine 110 to determine a coverage region over which radar device 220 may be able to detect objects within its field of view. The coverage determining system 200 may also enable the user to calibrate radar device 220 by changing the position and/or orientation of radar device 220 so as to improve its accuracy and/or range. Further, coverage determining system 200 may also be configured to generate coverage maps that provide the user with an easy to understand graphical representation of the accuracy of radar device 220 throughout the radar coverage region.

The embodiments discussed above may allow a user of machine 110 to operate machine 110 using radar devices without the need for additional lidar devices. Moreover, the processes discussed above may also be implemented for multiple radar devices. For example, coverage regions may be determined for each of multiple radar devices, and coverage maps corresponding to the multiple radar devices may be displayed together along with a diagram of the machine on which the radar devices are installed. This graphical representation may display to the user the combined coverage regions of the multiple radar devices compared to the geometry of the machine, so that a user can easily visualize the scope of coverage offered by the radar devices and identify (and remedy) any potential blind spots.

It will be apparent to those skilled in the art that various modifications and variations can be made to the disclosed coverage determining system. Other embodiments will be apparent to those skilled in the art from consideration of the specification and practice of the disclosed coverage determining system. It is intended that the specification and examples be considered as exemplary only, with a true scope being indicated by the following claims and their equivalents.

What is claimed is:

1. A computer-implemented method for determining a coverage region of a radar device, the computer-implemented method comprising:
   generating, by a radar device mounted on a machine, radar data including radar data points representing objects detected by the radar device;

generating, by a lidar device mounted on the machine, lidar data including lidar data points representing objects detected by the lidar device;

calculating a distance between each one of the radar data points and a corresponding one of the lidar data points;

determining an accuracy value for each one of a plurality of sub-regions based on the calculated distances of the radar data points in the sub-region;

determining, by the one or more processors, a radar coverage region for the radar device, the radar coverage region including a group of sub-regions with accuracy values within a predetermined range; and generating, by the one or more processors, data used to display a graphical representation of the radar coverage region.

2. The computer-implemented method according to claim 1, further including:

comparing the radar coverage region to an ideal radar coverage region; and determining that at least one of a location and an orientation of the radar device should be adjusted responsive to the comparison of the radar coverage region to the ideal radar coverage region.

3. The computer-implemented method according to claim 1, further including:

generating data to display a graphical representation of the accuracy value for the sub-region included in the radar coverage region; and displaying the graphical representation of the radar coverage region including the graphical representation of the accuracy value for the sub-region.

4. The computer-implemented method according to claim 1, wherein determining the accuracy value for the sub-region includes:

comparing calculated distances between each radar data point and a corresponding lidar data point in the sub-region to a threshold value; and determining an accuracy value for the sub-region to be a percentage of the calculated distances that are less than or equal to the threshold value.

5. The computer-implemented method according to claim 1, wherein the radar coverage region is determined based on at least one of a number of false positive radar data points or a number of false negative radar data points generated by the radar device.

6. The computer-implemented method according to claim 1, further including:

displaying the graphical representation of the radar coverage region as a radar coverage map that includes multiple colors representing different accuracy values for sub-regions in the radar coverage map.

7. The computer-implemented method according to claim 6, wherein the machine includes a plurality of radar devices, the method further including:

displaying a graphical representation of a machine; and displaying a plurality of radar coverage maps with the graphical representation of the machine, wherein each of the radar coverage maps corresponds to one of the plurality of radar devices that are included on the machine and is displayed based on a location and an orientation of the corresponding radar device on the machine.

8. A system for determining a coverage region of a radar device, the system comprising:

a radar device mounted on a machine for generating radar data including radar data points representing objects detected by the radar device;

a lidar device mounted on the machine for generating lidar data including lidar data points representing objects detected by the lidar device;

one or more processors; and a memory storing instructions that, when executed, enable the one or more processors to:

receive the radar data generated by the radar device and the lidar data generated by the lidar device;

calculate a distance between each one of the radar data points and a corresponding one of the lidar data points;

determine accuracy values for each one of a plurality of sub-regions based on the calculated distances of the radar data points in the sub-region;

determine a radar coverage region for the radar device, the radar coverage region including a group of sub-regions with accuracy values within a predetermined range; and generate data used to display a graphical representation of the radar coverage region.

9. The system according to claim 8, the instructions further enabling the one or more processors to:

compare the radar coverage region to an ideal radar coverage region; and determine that at least one of a location and an orientation of the radar device should be adjusted responsive to the comparison of the radar coverage region to the ideal radar coverage region.

10. The system according to claim 8, further comprising:

a display device, wherein the instructions further enable the one or more processors to:

generate data to display a graphical representation of the accuracy value for the sub-region included in the radar coverage region; and display, via the display device, the graphical representation of the radar coverage region including the graphical representation of the accuracy value for the sub-region.

11. The system according to claim 8, the instructions further enabling the one or more processors to:

compare calculated distances between each radar data point and a corresponding lidar data point in the sub-region to a threshold value; and determine an accuracy value for the sub-region to be a percentage of the calculated distances that are less than or equal to the threshold value.

12. The system according to claim 8, wherein the radar coverage region is determined based on at least one of a number of false positive radar data points or a number of false negative radar data points generated by the radar device.

13. The system according to claim 8, further including:

a display device, wherein the instructions further enable the one or more processors to display, via the display device, the graphical representation of the radar coverage region as a radar coverage map that includes multiple colors representing different accuracy values for sub-regions in the radar coverage map.

14. The system according to claim 13, further including a plurality of radar devices, the instructions further enabling the one or more processors to:

display a graphical representation of a machine; and display a plurality of radar coverage maps with the graphical representation of the machine, wherein each of the radar coverage maps corresponds to one of the plurality of radar devices that are included on the machine and is displayed based on a location and an orientation of the corresponding radar device on the machine.

15. The system according to claim 8, further including the lidar device.

16. A system comprising:
an earthmoving machine; and
a radar device connected to the earthmoving machine;
a lidar device connected to the earthmoving machine;
one or more processors; and
a memory storing instructions that, when executed, enable the one or more processors to:
receive radar data generated by the radar device and lidar data generated by the lidar device, the radar data including radar data points representing objects detected by the radar device and the lidar data including lidar data points representing objects detected by the lidar device;
calculate a distance between a radar data point in the radar data and a corresponding lidar data point in the lidar data;
determine accuracy values for a plurality of sub-regions included in a region based on the calculated distance;
determine a radar coverage region for the radar device, the radar coverage region including a group of sub-regions with accuracy values within a predetermined range; and
generate data used to display a graphical representation of the radar coverage region.

17. The system according to claim 16, the radar device having been further configured by:
comparing the radar coverage region to an ideal radar coverage region; and
determining that at least one of a location and an orientation of the radar device should be adjusted responsive to the comparison of the radar coverage region to the ideal radar coverage region.

18. The system according to claim 16, wherein the earthmoving machine is an autonomous material-moving machine.

* * * * *